(12) United States Patent
Kim

(10) Patent No.: US 9,017,850 B2
(45) Date of Patent: Apr. 28, 2015

(54) SECONDARY BATTERY

(75) Inventor: Dukjung Kim, Yongin-si (KR)

(73) Assignees: Samsung SDI Co., Ltd., Giheung-gu, Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 478 days.

(21) Appl. No.: 13/429,802

(22) Filed: Mar. 26, 2012

(65) Prior Publication Data

US 2012/0270089 A1  Oct. 25, 2012

(30) Foreign Application Priority Data

Apr. 19, 2011  (KR) ........................ 10-2011-0036011

(51) Int. Cl.

| H01M 2/30 | (2006.01) |
|---|---|
| H01M 2/24 | (2006.01) |
| H01M 10/50 | (2006.01) |
| H01M 2/02 | (2006.01) |
| H01M 2/10 | (2006.01) |
| H01M 10/613 | (2014.01) |
| H01M 10/647 | (2014.01) |
| H01M 10/654 | (2014.01) |
| H01M 10/6557 | (2014.01) |

(52) U.S. Cl.
CPC ............ *H01M 2/0217* (2013.01); *H01M 2/024* (2013.01); *H01M 2/1016* (2013.01); *H01M 10/5004* (2013.01); *H01M 10/5032* (2013.01); *H01M 10/5042* (2013.01); *H01M 10/5059* (2013.01)

(58) Field of Classification Search
CPC ........... H01M 2/30; H01M 2/20; H01M 2/24; H01M 10/50
USPC .......................................... 429/120, 149, 160
See application file for complete search history.

(56) References Cited

U.S. PATENT DOCUMENTS

| 4,383,013 | A | * | 5/1983 | Bindin et al. ................. 429/112 |
|---|---|---|---|---|
| 2007/0026300 | A1 | | 2/2007 | Lee et al. |
| 2007/0026301 | A1 | | 2/2007 | Lee et al. |
| 2007/0026303 | A1 | | 2/2007 | Jeon et al. |
| 2007/0037051 | A1 | | 2/2007 | Kim et al. |
| 2009/0202897 | A1 | | 8/2009 | Kim et al. |
| 2009/0305124 | A1 | | 12/2009 | Ahn et al. |
| 2009/0311586 | A1 | | 12/2009 | Chung et al. |
| 2010/0119928 | A1 | | 5/2010 | Yoon |

FOREIGN PATENT DOCUMENTS

| JP | 10-112330 | 4/1998 |
|---|---|---|
| JP | 10-172582 | 6/1998 |
| JP | 2003-331907 A | 11/2003 |
| JP | 2010-287490 A | 12/2010 |

OTHER PUBLICATIONS

Korean Office action issued by KIPO on Aug. 17, 2012 corresponding to KR Patent Application No. 10-2011-0036011. and "Request for Entry of the prior art references" attached herewith.

* cited by examiner

*Primary Examiner* — Karie O'Neill Apicella
(74) *Attorney, Agent, or Firm* — Robert E. Bushnell, Esq.

(57) ABSTRACT

A secondary battery includes a plurality of electrode assemblies; a case receiving the electrode assemblies; at least one electrode terminal electrically connected to the electrode assemblies and being exposed out of the case; and a hollow member, which is parallel to at least one surface of each of the electrode assemblies, passing through the case.

17 Claims, 6 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 19 Apr. 2011 and there duly assigned Serial No. 10-2011-0036011.

BACKGROUND OF THE INVENTION

1. Field of the Invention

Embodiments of the present invention relate to a secondary battery, and more particularly, to a secondary battery that has high heat dissipation performance and is resistant to swelling.

2. Description of the Related Art

Unlike primary batteries, secondary batteries are rechargeable. Of these secondary batteries, a low capacity secondary battery including a battery cell in the form of a pack may be used in portable small electronic devices such as cellular phones and camcorders, and a high capacity secondary battery including tens of battery cells connected to one another may be used as a motor-driving power source for electric scooters, hybrid vehicles, and electric vehicles.

Secondary batteries may be manufactured in various shapes such as a cylindrical shape and a prismatic shape. A secondary battery may include electrolyte, an electrode assembly, a case receiving the electrode assembly and the electrode, and a cap plate disposed on the case. The electrode assembly may be formed by disposing an insulating separator between positive and negative electrode plates. The electrode assembly may be electrically connected to positive and negative terminals which are exposed by protruding to the exterior of the secondary battery through the cap plate.

SUMMARY OF THE INVENTION

An aspect of the present invention provides a secondary battery that has high heat dissipation performance and is resistant to swelling.

In accordance with one embodiment, a secondary battery includes a plurality of electrode assemblies; a case accommodating the electrode assemblies; at least one electrode terminal electrically connected to the electrode assemblies and the electrode terminal being exposed out of the case; and a hollow member parallel to at least one surface of each of the electrode assemblies, and the hollow member passing through the case.

The hollow member may bring the electrode assemblies into close contact with an inner surface of the case.

A coolant may pass through the case through the hollow member.

The electrode assemblies may include a first electrode assembly and a second electrode assembly, wherein a side surface of the first electrode assembly and a side surface of the second electrode assembly face both side surfaces of the hollow member, respectively; and a third electrode assembly and a fourth electrode assembly, wherein a side surface of the third electrode assembly and a side surface of the fourth electrode assembly face both other side surfaces of the hollow member, respectively.

The electrode assemblies may include a first electrode assembly and a second electrode assembly, which are arrayed in a first direction perpendicular to a longitudinal direction of the hollow member; and a third electrode assembly and a fourth electrode assembly, which are arrayed in a second direction perpendicular to both the longitudinal direction and the first direction.

The first and second electrode assemblies may be different in size in comparison with the third and fourth electrode assemblies.

At least one pair of wide side surfaces of the first to fourth electrode assemblies may face both side surfaces of the hollow member.

The secondary battery may further include a first plate covering the case, wherein the first plate includes a plate opening, and the plate opening communicates with the hollow member.

The first plate may be provided with a first electrode terminal, and the first plate may be electrically connected to the electrode assembly.

The first plate may include an electrical insulator, the first plate may be coupled to a first electrode terminal, and the secondary battery may further include a lead plate electrically connecting the first electrode terminal to the electrode assemblies.

The secondary battery may further include a second plate disposed between an internal surface of the case and the electrode assemblies, wherein the second plate includes a second plate opening, and the second plate opening communicates with the hollow member.

The second plate may be provided with a second electrode terminal, the second plate may be electrically connected to the electrode assemblies, and the secondary battery may further include an insulating member electrically insulating the second plate and the case from each other.

The secondary battery may further include a collector accommodated in the case and electrically connecting the electrode assemblies to the electrode terminal; and a cap plate including a terminal hole through which the electrode terminal passes, and covering a top opening of the case, wherein the electrode terminal includes a first electrode terminal and a second electrode terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Korean Patent Application No. 10-2011-0036011 filed on Apr. 19, 2011, in the Korean Intellectual Property Office, and entitled: "secondary battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1A:
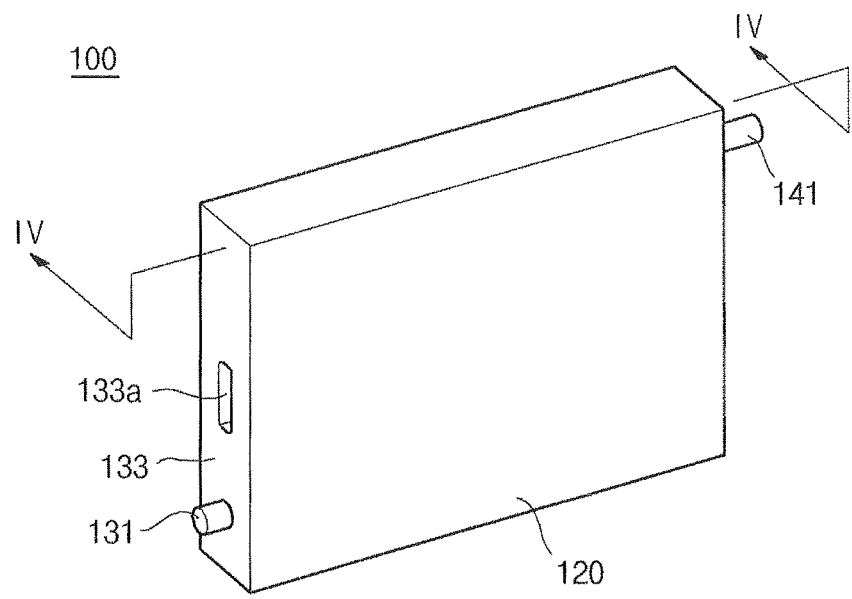
FIGS. 1A and 1B are oblique views illustrating a secondary battery constructed with an embodiment of the present invention.
Figure 1B:
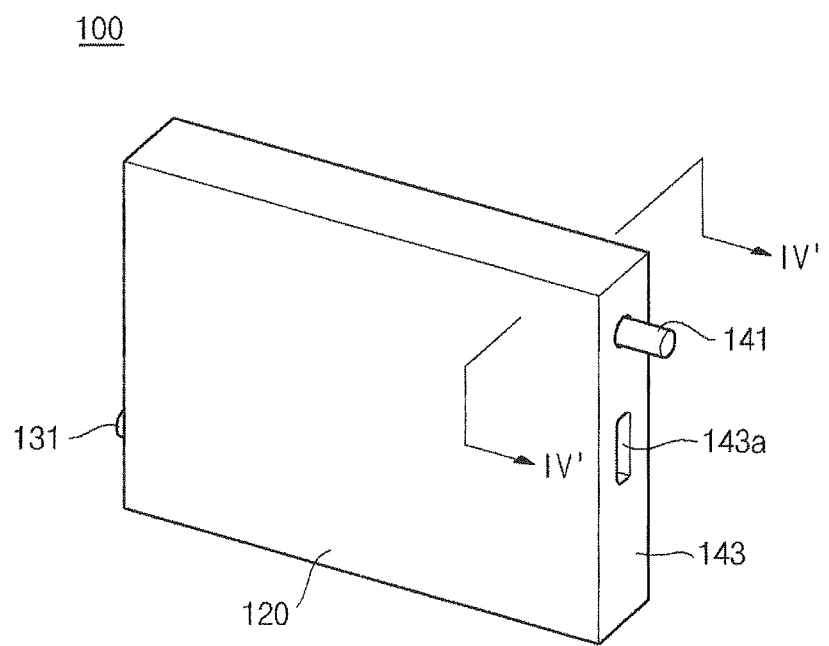
Figure 2A:
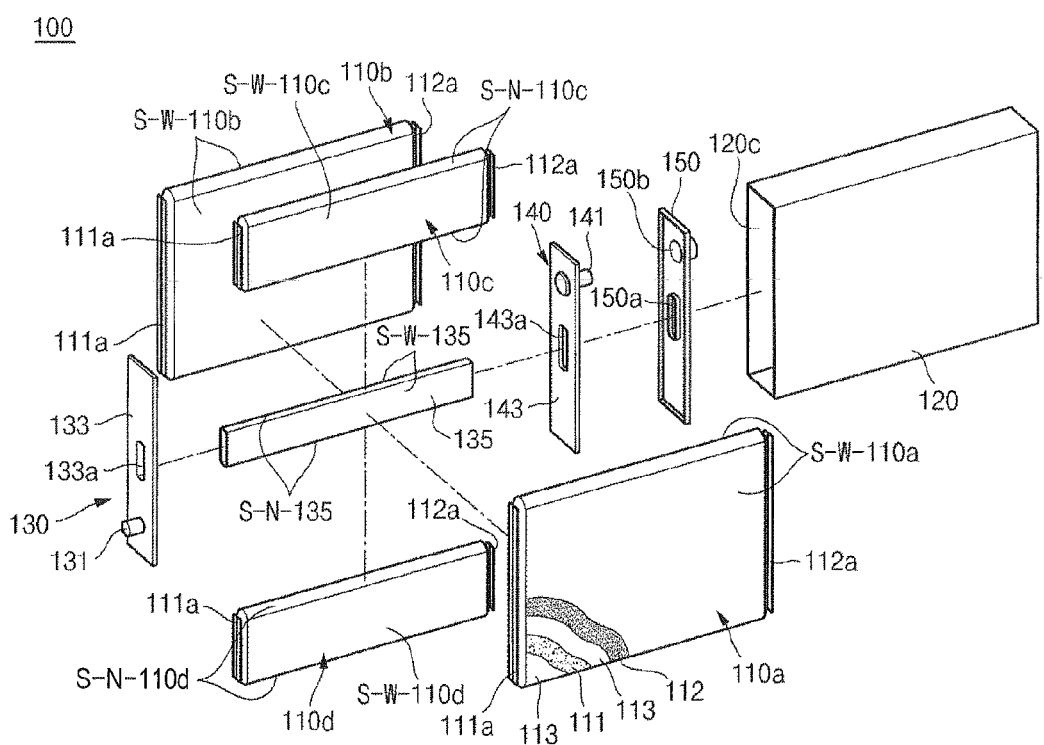
FIGS. 2A and 2B are exploded oblique views respectively illustrating the secondary battery of the FIGS. 1A and 1B.
Figure 2B:
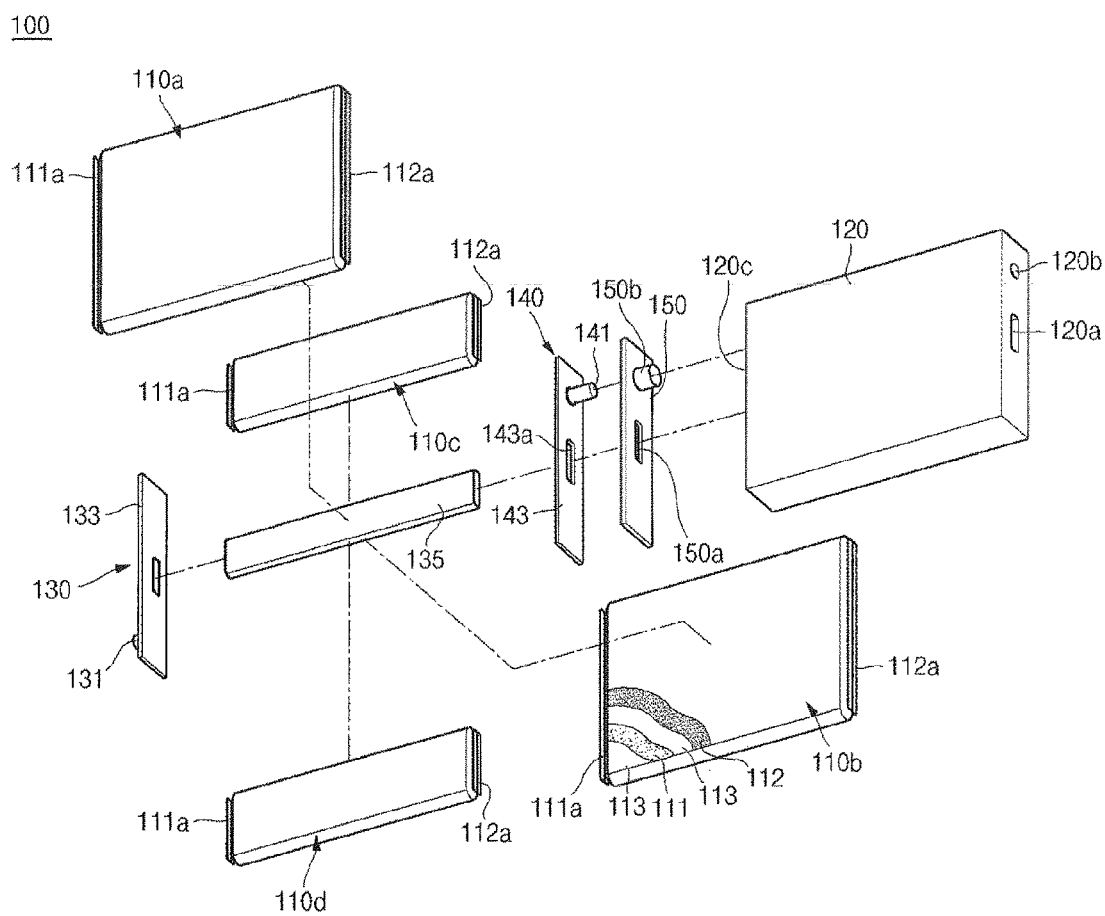
Figure 3A:
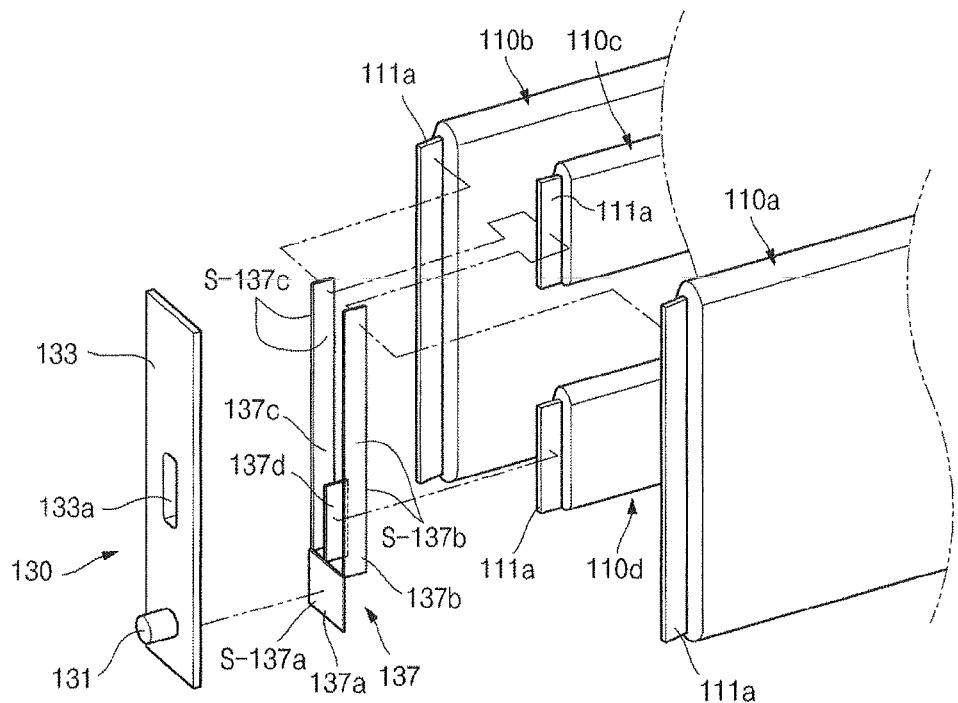
FIG. 3A is an exploded oblique partial view illustrating a first electrode terminal coupled to first to fourth electrode assemblies through a lead plate constructed with an embodiment of the present invention.
Figure 3B:
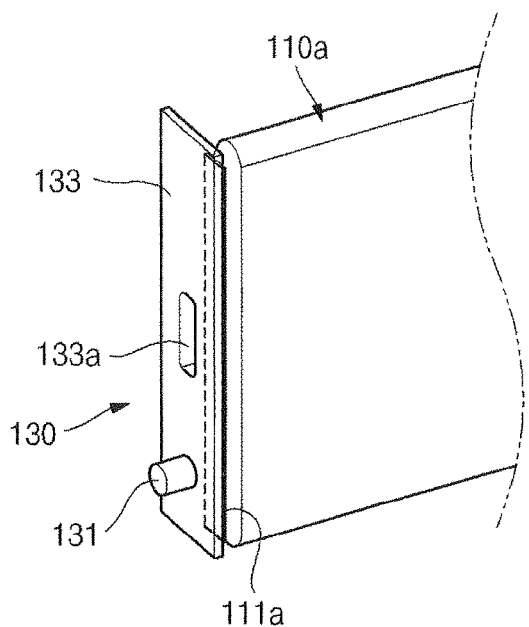
FIG. 3B is an oblique view illustrating a first electrode terminal coupled to a first electrode assembly using welding, constructed with to an embodiment of the present invention.
Figure 4A:
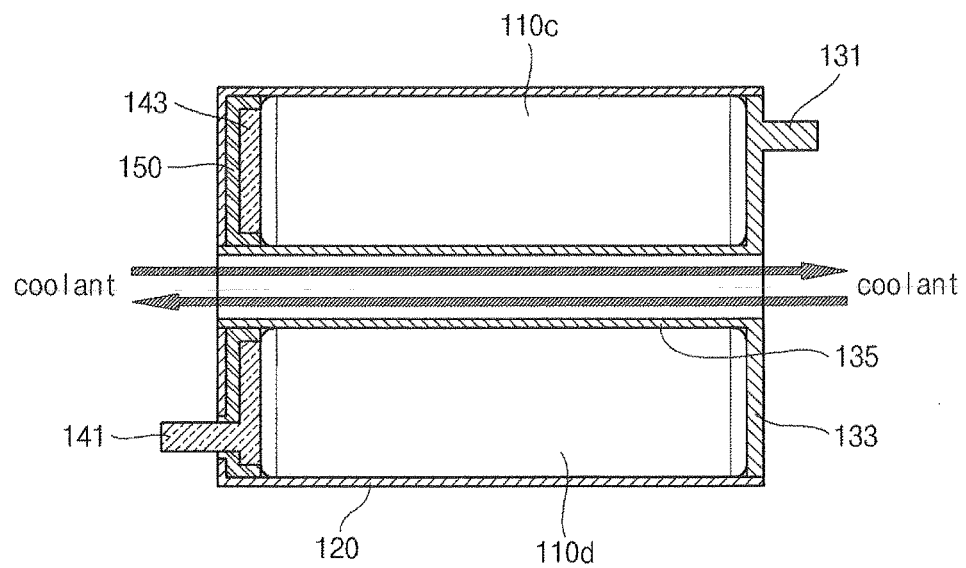
FIG. 4A is a cross-sectional view taken along line IV-IV of FIG. 1A.
Figure 4B:
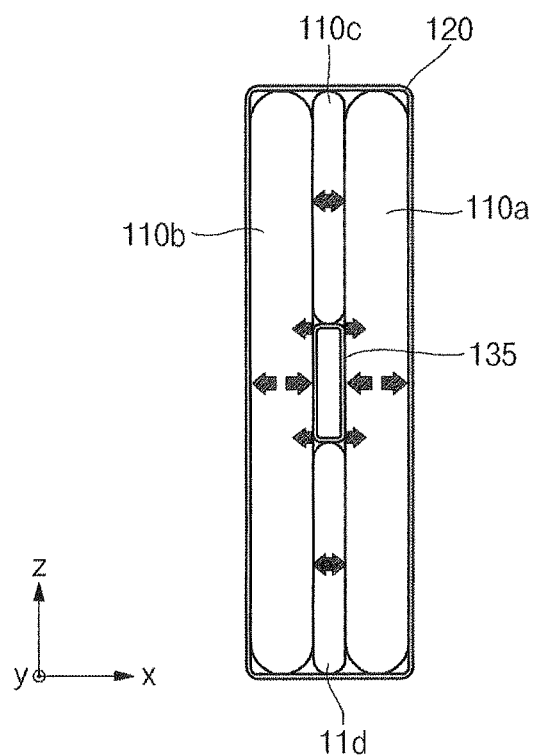
FIG. 4B is a cross-sectional view taken along line IV'-IV' of FIG. 1B.

FIGS. 1A and 1B are perspective views illustrating a secondary battery 100 constructed with an embodiment of the present invention. FIGS. 2A and 2B are exploded oblique views illustrating the secondary battery 100. FIG. 3A is an exploded oblique view illustrating a first electrode terminal coupled to electrode assemblies through a lead plate according to the current embodiment. FIG. 3B is an oblique view illustrating the first electrode terminal coupled to a first electrode assembly using welding. FIG. 4A is a cross-sectional view taken along line IV-IV of FIG. 1A. FIG. 4B is a cross-sectional view taken along line IV'-IV' of FIG. 1B.

Referring to FIGS. 1 through 4B, the secondary battery 100 includes electrode assemblies 110a, 110b, 110c, and 110d, a case 120, a first terminal part 130, a hollow member 135, and a second terminal part 140.

The electrode assemblies 110a, 110b, 110c, and 110d may include first to fourth electrode assemblies (also denoted by 110a, 110b, 110c, and 110d). Although the first to fourth electrode assemblies 110a, 110b, 110c, and 110d are illustrated in FIGS. 2A and 2B, the present invention is not limited to the number of electrode assemblies.

The first to fourth electrode assemblies 110a, 110b, 110c, and 110d have the similar configurations. Thus, the first electrode assembly 110a will be principally described, and a description of the second to fourth electrode assemblies 110b, 110c, and 110d will be omitted. The sizes of the first and second electrode assemblies 110a and 110b however may be different from those of the third and fourth electrode assemblies 110c and 110d, which will be described later.

The first electrode assembly 110a may be a roll-type electrode assembly. For example, the first electrode assembly 110a is formed by winding or stacking a first electrode plate 111, a separator 113, and a second electrode plate 112, each of which has a thin plate or film shape. The first electrode plate 111 may function as a positive electrode or a negative electrode, and the second electrode plate 112 may have the opposite pole to that of the first electrode plate 111. Roll-type electrode assemblies are exemplified in the current embodiment, but the present invention is not limited thereto, and thus, stack-type electrode assemblies may be exemplified.

The first electrode plate 111 is formed by applying a first electrode active material such as a transition metal oxide on a first electrode collector formed of metal foil such as aluminum foil, and the first electrode plate 111 includes a first electrode non-coating portion 111a on which the first electrode active metal is not applied. The first electrode non-coating portion 111a functions as a passage for a current flowing between the first electrode plate 111 and the outside of the first electrode plate 111. The material of the first electrode plate 111 is not limited in the present invention.

The second electrode plate 112 is formed by applying a second electrode active material such as graphite or carbon on a second electrode collector formed of metal foil such as nickel or copper foil, and the second electrode plate 112 includes a second electrode non-coating portion 112a on which the second electrode active metal is not applied. The second electrode non-coating portion 112a functions as a passage for a current flowing between the second electrode plate 112 and the outside of the second electrode plate 112. The material of the second electrode plate 112 is not limited in the present invention.

The first and second electrode plates 111 and 112 may change their poles with each other.

The separator 113 is disposed between the first electrode plate 111 and the second electrode plate 112 to prevent a short circuit and to allow the movement of lithium ions, and the separator 113 may be formed of poly ethylene, poly propylene, or combined film of poly propylene and poly ethylene. The material of the separator 113 is not limited in the present invention.

Both ends of the first electrode assembly 110a are coupled to the first and second terminal parts 130 and 140 which are electrically connected respectively to the first and second electrode plates 111 and 112. In one embodiment, both ends of each of the electrode assemblies 110b, 110c, and 110d are respectively coupled to the first and second terminal parts 130 and 140.

Substantially, the first electrode assembly 110a and electrolyte are disposed in the case 120. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be liquid, solid, or gel.

The electrode assemblies 110a, 110b, 110c, and 110d may be laterally inserted into the case 120.

The case 120 may be formed of a conductive metal such as aluminum, aluminum alloy, or steel plated with nickel. The case 120 has an approximately hexahedron shape to accommodate the electrode assemblies 110a, 110b, 110c, and 110d, the first terminal part 130, the hollow member 135, and the second terminal part 140. The case 120 has an opening 120c at one side, and the case 120 has a case opening 120a and a case terminal hole 120b at an opposite side, which will be described later. The case opening 120a corresponds to a second plate opening 143a of a second plate 143 to be described later. A second electrode terminal 141 of the second plate 143 passes through the case terminal hole 120b.

The inner surface of the case 120 is treated to be electrically insulated from the electrode assemblies 110a, 110b, 110c, and 110d, and the first and second terminal parts 130 and 140.

The first terminal part 130 includes a first electrode terminal 131 and a first plate 133. The first electrode terminal 131 is fitted in a terminal hole of the first plate 133, is then coupled to the first plate 133 using welding and riveting, and protrudes a certain distance from the first plate 133. The first plate 133 covers a side portion of the case 120 to seal the case 120. The first plate 133 includes a first plate opening 133a. The first plate opening 133a communicates with an end of the hollow member 135 and is coupled to the hollow member 135 by using welding.

A structure for connecting the first terminal part 130 to the electrode assemblies 110a, 110b, 110c, and 110d may be varied according to whether the first plate 133 is an electrical conductor or an electrical insulator.

First, the case in which the first plate 133 is an electrical conductor will now be described.

Referring to FIG. 3A, the first electrode terminal 131 may be connected to the electrode assemblies 110a, 110b, 110c, and 110d through a lead plate 137. The lead plate 137 includes thin metal plates formed of a flexible material. The thin metal plates may be a first lead 137a, a second lead 137b, a third lead 137c, and a fourth lead 137d.

The first lead 137a is welded to a portion of the first electrode terminal 131 riveted to the right surface of the first plate 133, so that the lead plate 137 can be electrically connected to the first electrode terminal 131.

The second lead 137b and the third lead 137c extend from a side of the first lead 137a, and are parallel to each other. Surfaces S-137b and S-137c of the second and third leads 137b and 137c are approximately perpendicular to a surface S-137a of the first lead 137a. A surface S-137b of the second lead 137b is welded to the first electrode non-coating portion 111a of the first electrode assembly 110a, and thus, the lead plate 137 is electrically connected to the first electrode assembly 110a. A surface S-137c of the third lead 137c is welded to the first electrode non-coating portion 111a of the second electrode assembly 110b, and thus, the lead plate 137 is electrically connected to the second electrode assembly 110b.

At least one of another surface S-137b of the second lead 137b and another surface S-137c of the third lead 137c is welded to the first electrode non-coating portion 111a of the third electrode assembly 110c, and thus, the lead plate 137 is electrically connected to the third electrode assembly 110c.

The fourth lead 137d is disposed between the second and third leads 137b and 137c, and extends from a side of the first lead 137a, and are parallel to the second and third leads 137b and 137c. The fourth lead 137d is shorter than the second and third leads 137b and 137c. The fourth lead 137d is welded to the first electrode non-coating portion 111a of the fourth electrode assembly 110d, and thus, the lead plate 137 is electrically connected to the fourth electrode assembly 110d.

The lead plate 137 is configured and connected as described above, but is not limited thereto. Thus, a lead plate may have various configurations and connecting structures to electrically connect the first electrode terminal 131 to the electrode assemblies 110a, 110b, 110c, and 110d.

In another embodiment, as illustrated in FIG. 3B, the right surface of the first plate 133 may be welded directly to the first electrode non-coating portion 111a of the first electrode assembly 110a without using the lead plate 137 to electrically connect the first electrode terminal 131 to the first electrode assembly 110a. Although only the first electrode assembly 110a is connected to the first plate 133 in FIG. 3B, the second to fourth electrode assemblies 110b, 110c, and 110d may be welded to the first plate 133 in the manner as illustrated in FIG. 3B.

Second, the case in which the first plate 133 is an electrical insulator will now be described.

When the first plate 133 is an electrical insulator, the first electrode terminal 131 may be electrically connected to the electrode assemblies 110a, 110b, 110c, and 110d through the lead plate 137 as illustrated in FIG. 3A.

The hollow member 135 is disposed in the case 120 and passes through the case 120. The hollow member 135 may have an approximately tetragonal pipe shape. An end of the hollow member 135 communicates with the first plate opening 133a of the first plate 133, and may be connected to the first plate 133 using various methods such as welding. Accordingly, for example, a coolant such as air may pass through the case 120 through the hollow member 135.

The hollow member 135 is parallel to a surface of each of the electrode assemblies 110a, 110b, 110c, and 110d. As shown in FIG. 4B, an axis passing through the left and right surfaces of the hollow member 135 is defined as an x-axis, and an axis passing through both ends thereof is defined as a y-axis, and an axis passing through the upper and lower surfaces thereof is defined a z-axis. Hereinafter, arrangement of the hollow member 135 and the electrode assemblies 110a, 110b, 110c, and 110d will now be described. In one embodiment, the y-axis may be along the longitudinal direction of the hollow member 135.

The left and right surfaces of the hollow member 135 (along the x-axis) may face a side surface of the first electrode assembly 110a and a side surface of the second electrode assembly 110b, respectively. The upper and low surfaces of the hollow member 135 (along the z-axis) may face a side surface of the third electrode assembly 110c and a side surface of the fourth electrode assembly 110d, respectively.

Referring to FIGS. 2A through 4B, wide side surfaces S-W-135 of the hollow member 135 may face wide side surfaces S-W-110a and S-W-110b of the first and second electrode assemblies 110a and 110b, respectively. Narrow side surfaces S-N-135 of the hollow member 135 may face narrow side surfaces S-N-110c and S-N-110d of the third and fourth electrode assemblies 110c and 110d, respectively. In this case, the wide side surfaces S-W-110a and S-W-110b of the first and second electrode assemblies 110a and 110b may be larger than wide side surfaces S-W-110c and S-W-110d of the third and fourth electrode assemblies 110c and 110d. Each of electrode assemblies 110a, 110b, 110c and 110d has two opposite wide side surfaces and two opposite narrow side surfaces, and the two wide side surfaces are separated by the two narrow side surfaces.

Alternatively, wide side surfaces of the hollow member 135 (along the x-axis) may face wide side surfaces of the third and fourth electrode assemblies 110c and 110d, respectively. Narrow side surfaces of the hollow member 135 (along the z-axis) may face narrow side surfaces of the first and second electrode assemblies 110a and 110b, respectively. In this case, the wide side surfaces of the third and fourth electrode assemblies 110c and 110d may be larger than the wide side surfaces of the first and second electrode assemblies 110a and 110b.

Alternatively, wide side surfaces of the first to fourth electrode assemblies 110a, and 110b, 110c and 110d may face the side surfaces of the hollow member 135, respectively.

Accordingly, the side surfaces of the hollow member 135 may be surrounded by the first to fourth electrode assemblies 110a, and 110b, 110c and 110d. The ends of the hollow member 135 (along the y-axis) are open. According to the arrangement of the hollow member 135 and the first to fourth electrode assemblies 110a, 110b, 110c, and 110d, the hollow member 135 brings the first to fourth electrode assemblies 110a, 110b, 110c, and 110d into close contact with the inner surface of the case 120.

The hollow member 135 may have high heat dissipation performance and high elasticity.

The second terminal part 140 includes the second electrode terminal 141 and the second plate 143. The second electrode terminal 141 is fitted in a terminal hole of the second plate 143, and then, is coupled to the second plate 143 using welding and riveting, and protrudes a certain distance from the second plate 143. The second plate 143 is disposed between an inner surface of the case 120 and the first to fourth electrode assemblies 110a, 110b, 110c, and 110d. The second plate 143 includes the second plate opening 143a. A side of the second plate opening 143a communicates with a second end of the hollow member 135 at a side, and the other side of the plate opening 143a communicates with the case opening 120a. The second end of the hollow member 135, the second plate opening 143a, and the case opening 120a communicate with one another.

A connecting structure between the second terminal part 140 and the first to fourth electrode assemblies 110a, 110b, 110c, and 110d is determined according to whether the second plate 143 is an electrical insulator or an electrical conductor, like the case where the first terminal part 130 is connected to the first to fourth electrode assemblies 110a, 110b, 110c, and 110d.

If the second plate 140 is an electrical conductor, although not shown, the second electrode terminal 141 may be electrically connected to the first to fourth electrode assemblies 110a, 110b, 110c, and 110d through a lead plate, as illustrated in FIG. 3A. In this case, the lead plate for the second terminal part 140 has the same configuration as that of the lead plate 137. However, since the second terminal part 140 is an electrical conductor, an insulating member 150 may be disposed between the second terminal part 140 and the case 120 to electrically insulate the second terminal part 140 and the case 120 from each other. The insulating member 150 will be described later in detail.

In addition, when the second plate 140 is an electrical conductor, although not shown, the second plate 143 and the second electrode non-coating portion 112a are welded, as illustrated in FIG. 3B. Thus, the second electrode terminal 141 is electrically connected to the first to fourth electrode assemblies 110a, 110b, 110c, and 110d.

When the second plate 143 is an electrical insulator, the second electrode terminal 141 may be electrically connected to the first to fourth electrode assemblies 110a, 110b, 110c, and 110d through a lead plate, as illustrated in FIG. 3A. In this case, the insulating member 150 may be removed.

The shape of the insulating member 150 is similar to that of the second plate 143. The insulating member 150 may surround a portion of the second terminal part 140. For example, the insulating member 150 may surround the right surface and a boundary surface of the second terminal part 140.

The insulating member 150 includes a terminal hole part 150b to surround a portion of the second terminal part 141. The second electrode terminal 141 may pass through the terminal hole part 150b that may have a cylindrical shape protruding a certain height to surround a portion of the second electrode terminal 141. The height of the terminal hole part 150b is smaller than that of the second electrode terminal 141, and is equal to or greater than the thickness of the case 120. Thus, the terminal hole part 150b prevents direct contact of the second electrode terminal 141 with the case 120, thereby insulating the second electrode terminal 141 and the case 120 from each other.

The insulating member 150 includes an insulating member opening 150a. The insulating member opening 150a corresponds to the second plate opening 143a and the case opening 120a. Thus, the second end of the hollow member 135, the second plate opening 143a, the insulating member opening 150a, and the case opening 120a communicate with one another.

According to the embodiment, the inner surface of the hollow member 135 increases an external exposure area of the case 120, thereby improving the heat dissipation performance of the secondary battery. For example, as illustrated in FIG. 4A, a coolant such as air may pass through the case 120 through the hollow member 135, thereby more effectively dissipating heat from the secondary battery.

In addition, as illustrated in FIG. 4B, when a portion of force due to swelling of the secondary battery is applied to the hollow member 135 in the center of the case 120, a side wall of the hollow member 135 may be bent. Accordingly, when the secondary battery swells, deformation of the case 120 can be reduced.

Since the hollow member 135 brings the first to fourth electrode assemblies 110a, 110b, 110c, and 110d into close contact with the inner surface of the case 120, the safety of the secondary battery can be improved.

Figure 5:
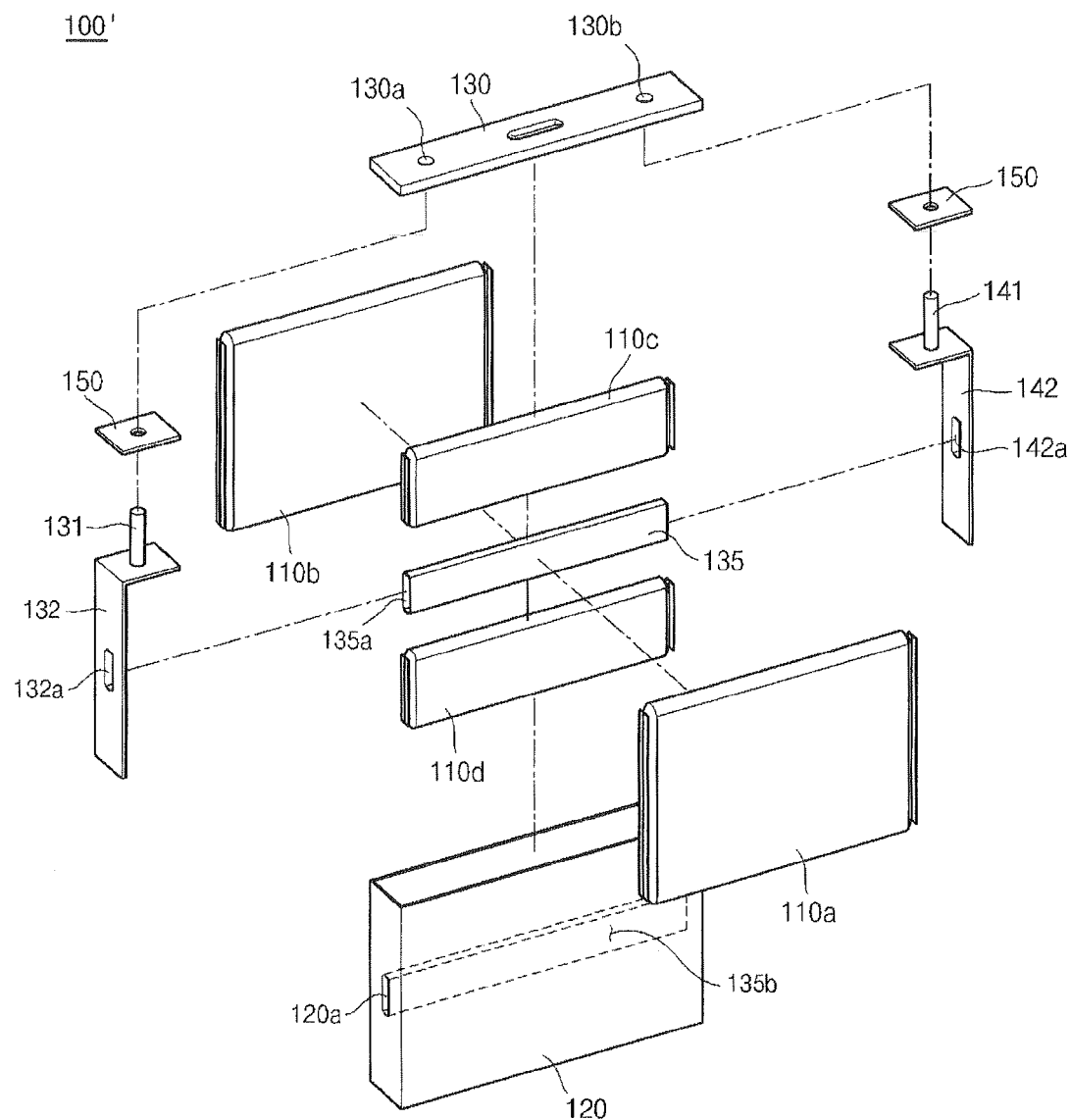
FIG. 5 is an exploded oblique view illustrating a secondary battery constructed with another embodiment of the present invention.

FIG. 5 is an exploded perspective view illustrating a secondary battery 100' constructed with another embodiment.

Referring to FIG. 5, the secondary battery 100' may include first to fourth electrode assemblies 110a, 110b, 110c, and 110d, a case 120, a cap plate 130, a first electrode terminal 131, a second electrode terminal 141, a first collector 132, a second collector 142, a hollow member 135, and insulating members 150.

The first to fourth electrode assemblies 110a, 110b, 110c, and 110d, and the hollow member 135 constructed with the current embodiment are similar in configuration to the first to fourth electrode assemblies 110a, 110b, 110c, and 110d and the hollow member 135 constructed with the previous embodiment. The case 120 however may have a pair of long side surfaces and a pair of short side surfaces, and one of the long side surfaces may be open. While one of the short side surfaces of the case 120 is open to receive inner parts in the previous embodiment, one of the long side surfaces of the case 120 may be open to do in the current embodiment. The short side surfaces of the case 120 include side openings 120a, respectively. The side openings 120a communicate with a hollow part 135a of the hollow member 135, so that the hollow member 135 can pass through the case 120.

Since the configuration of the cap plate 130, the first and second electrode terminals 131 and 141, and the first and second collectors 132 and 142 are similar to the configuration of typical ones, a description thereof will be omitted.

The first collector 132 includes a first connection part and a second connection part. The first connection part of the first collector 132 is electrically connected to the first electrode terminal 131. The second connection part of the first collector 132 is bent from a side of the first connection part and extends, and is welded to first electrode non-coating portions 111a of the first to fourth electrode assemblies 110a, 110b, 110c, and 110d, and thus, is electrically connected thereto.

The second collector 142 includes a first connection part and a second connection part. The first connection part of the second collector 142 is electrically connected to the second electrode terminal 141. The second connection part of the second collector 142 is bent from a side of the first connection part and extends, and is welded to second electrode non-coating portions 112a of the first to fourth electrode assemblies 110a, 110b, 110c, and 110d, and thus, is electrically connected thereto.

The first and second collectors 132 and 142 include collector openings 132a and 142a, respectively. Both ends of the hollow member 135 are fitted in the collector openings 132a and 142a.

A process of assembling the secondary battery 100' may be as follows. First, an end of the hollow member 135 is fitted into the collector opening 132a of the first collector 132, then, the first collector 132 is welded to the first electrode non-coating portions 111a of the first to fourth electrode assemblies 110a, 110b, 110c, and 110d, then, the other end of the hollow member 135 is fitted into the collector opening 142a of the second collector 142, and then, the second collector 142 is welded to the second electrode non-coating portions 112a of the first to fourth electrode assemblies 110a, 110b, 110c, and 110d. As a matter of course, the second collector 142 may be connected to the first to fourth electrode assemblies 110a, 110b, 110c, and 110d, and the hollow member 135 before the first collector 132 is connected thereto. After that, the first to fourth electrode assemblies 110a, 110b, 110c, and 110d, the first and second collectors 132 and 142, and the hollow member 135 are accommodated in the case 120. Thereafter, the hollow part 135*a* of the hollow member 135 may be welded to surfaces defining the side openings 120*a* of the case 120. The cap plate 130 covers the upper portion of the case 120, and is welded thereto.

In accordance with the current embodiment, the effect according to the previous embodiment can also be attained. Furthermore, since the hollow member 135 is fitted in the collector openings 132*a* and 142*a* of the first and second collectors 132 and 142, and is fixed thereto, the first and second collectors 132 and 142 can be more securely coupled to the hollow member 135 within the case 120.

In accordance with the embodiment, the secondary battery has high heat dissipation performance and is resistant to swelling.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery, comprising:
   a plurality of electrode assemblies, each electrode assembly comprising a first electrode plate and a second electrode plate and a separator disposed between the first and second electrode plates;
   a case accommodating the electrode assemblies;
   a first electrode terminal disposed on one end of the case and a second electrode terminal disposed on an opposite end of the case, the first and second electrode terminals being exposed out of the case;
   the first electrode terminal electrically connected to one of the first and second electrode plates of all of the electrode assemblies, and the second electrode terminal electrically connected to the other one of the first and second electrode plates of all of the electrode assemblies; and
   a hollow member parallel to at least one surface of each of the electrode assemblies, and the hollow member passing through the case.

2. The secondary battery as claimed in claim 1, wherein the hollow member brings the electrode assemblies into close physical contact with an inner surface of the case.

3. The secondary battery as claimed in claim 1, wherein a coolant passes through the case via the hollow member.

4. The secondary battery as claimed in claim 1, wherein the electrode assemblies comprise:
   a first electrode assembly and a second electrode assembly, wherein a side surface of the first electrode assembly and a side surface of the second electrode assembly face both side surfaces of the hollow member, respectively; and
   a third electrode assembly and a fourth electrode assembly, wherein a side surface of the third electrode assembly and a side surface of the fourth electrode assembly face both other side surfaces of the hollow member, respectively.

5. The secondary battery as claimed in claim 4, wherein the first and second electrode assemblies are different in size in comparison with the third and fourth electrode assemblies.

6. The secondary battery as claimed in claim 4, wherein at least one pair of wide side surfaces of the first to fourth electrode assemblies face both side surfaces of the hollow member.

7. The secondary battery as claimed in claim 1, wherein the electrode assemblies comprise:
   a first electrode assembly and a second electrode assembly, which are arrayed in a first direction perpendicular to a longitudinal direction of the hollow member; and
   a third electrode assembly and a fourth electrode assembly, which are arrayed in a second direction perpendicular to both the longitudinal direction and the first direction.

8. The secondary battery as claimed in claim 7, wherein the first and second electrode assemblies are different in size in comparison with the third and fourth electrode assemblies.

9. The secondary battery as claimed in claim 7, wherein at least one pair of wide side surfaces of the first to fourth electrode assemblies face both side surfaces of the hollow member.

10. The secondary battery as claimed in claim 1, further comprising a first plate covering the case,
    wherein the first plate includes a plate opening, and
    the plate opening communicates with the hollow member.

11. The secondary battery as claimed in claim 10, wherein the first plate is provided with the first electrode terminal, and
    the first plate is electrically connected to the electrode assembly.

12. The secondary battery as claimed in claim 10, wherein the first plate comprises an electrical insulator,
    the first plate is coupled to the first electrode terminal, and
    the secondary battery further comprises a lead plate electrically connecting the first electrode terminal to the electrode assembly.

13. The secondary battery as claimed in claim 1, further comprising a second plate disposed between an internal surface of the case and the electrode assemblies,
    wherein the second plate includes a second plate opening, and
    the second plate opening communicates with the hollow member.

14. The secondary battery as claimed in claim 13, wherein the second plate is provided with the second electrode terminal,
    the second plate is electrically connected to the electrode assemblies, and
    the secondary battery further comprises an insulating member electrically insulating the second plate and the case from each other.

15. The secondary battery as claimed in claim 1, further comprising:
    a collector accommodated in the case and electrically connecting the electrode assemblies to the first or second electrode terminal; and
    a cap plate including a terminal hole through which the first or second electrode terminal passes, and covering a top opening of the case.

16. A secondary battery, comprising:
    a plurality of electrode assemblies, each electrode assembly comprising a first electrode plate and a second electrode plate and a separator disposed between the first and second electrode plates;
    a case accommodating the electrode assemblies;
    a first electrode terminal disposed on one end of the case and a second electrode terminal disposed on an opposite end of the case, the first and second electrode terminals being exposed out of the case;
    the first electrode terminal electrically connected to one of the first and second electrode plates of all of the electrode assemblies, and the second electrode terminal electrically connected to the other one of the first and second electrode plates of all of the electrode assemblies; and a hollow member having an empty interior and the hollow member passing through the case, with all side surfaces of the hollow member in immediate physical contact with one surface of each of the electrode assemblies.

17. The secondary battery as claimed in claim 16, further comprising:

two collectors disposed at two opposite ends of the hollow member, and each collector having an opening receiving each end of the hollow member.

* * * * *